(12) United States Patent
Chai et al.

(10) Patent No.: US 11,481,495 B2
(45) Date of Patent: Oct. 25, 2022

(54) ANOMALOUS BEHAVIOR DETECTION IN PROCESSOR BASED SYSTEMS

(71) Applicants: SRI International, Menlo Park, CA (US); The Trustees of Princeton University, Princeton, NJ (US)

(72) Inventors: Sek M. Chai, Princeton, NJ (US); Zecheng He, Princeton, NJ (US); Aswin Nadamuni Raghavan, Princeton, NJ (US); Ruby B. Lee, Princeton, NJ (US)

(73) Assignee: SRI International, Menlo Park, CA (US)

( * ) Notice: Subject to any disclaimer, the term of this patent is extended or adjusted under 35 U.S.C. 154(b) by 660 days.

(21) Appl. No.: 16/410,675

(22) Filed: May 13, 2019

(65) Prior Publication Data

US 2020/0293657 A1  Sep. 17, 2020

Related U.S. Application Data

(60) Provisional application No. 62/670,245, filed on May 11, 2018.

(51) Int. Cl.
*G06F 21/56* (2013.01)
*G06N 7/00* (2006.01)
(Continued)

(52) U.S. Cl.
CPC ........ *G06F 21/566* (2013.01); *G06F 11/3452* (2013.01); *G06N 7/005* (2013.01); *H04L 63/1425* (2013.01); *G06F 2201/88* (2013.01)

(58) Field of Classification Search
CPC combination set(s) only.
See application file for complete search history.

(56) References Cited

U.S. PATENT DOCUMENTS

2016/0299938 A1* 10/2016 Malhotra ............. G06K 9/6284
2017/0169357 A1*  6/2017 Caspi ..................... G06N 3/08
(Continued)

OTHER PUBLICATIONS

H. W. Lilliefors, "On the kolmogorov-smirnov test for normality with mean and variance unknown," Journal of the American statistical Association, vol. 62, No. 318, pp. 399-402, 1967.
(Continued)

*Primary Examiner* — Hee K Song
(74) *Attorney, Agent, or Firm* — Moser Taboada

(57) ABSTRACT

A method, apparatus and system for anomaly detection in a processor based system includes training a deep learning sequence prediction model using observed baseline behavioral sequences of at least one processor behavior of the processor based system, predicting baseline behavioral sequences from the observed baseline behavioral sequences using the sequence prediction model, determining a baseline reconstruction error distribution profile using the baseline behavioral sequences and the predicted baseline behavioral sequences, predicting test behavioral sequences from observed, test behavioral sequences using the sequence prediction model, determining a testing reconstruction error distribution profile using the observed test behavioral sequences and the predicted test behavioral sequences, and comparing the baseline reconstruction error distribution profile to the testing reconstruction error distribution profile to determine if an anomaly exists in a processor behavior of the processor based system.

19 Claims, 8 Drawing Sheets

(51) Int. Cl.
  *H04L 9/40* (2022.01)
  *G06F 11/34* (2006.01)

(56) References Cited

U.S. PATENT DOCUMENTS

| | | | | |
|---|---|---|---|---|
| 2018/0165576 | A1* | 6/2018 | Latapie | G06N 3/0472 |
| 2018/0330083 | A1* | 11/2018 | Abbaszadeh | G06N 20/00 |
| 2019/0188243 | A1* | 6/2019 | Sun | G06K 9/6277 |
| 2019/0312898 | A1* | 10/2019 | Verma | G06N 3/084 |
| 2020/0311544 | A1* | 10/2020 | Ramasamy | G06N 3/04 |

OTHER PUBLICATIONS

M. Wu and C. Jermaine, "Outlier detection by sampling with accuracy guarantees," in Proceedings of the 12th ACM SIGKDD international conference on Knowledge discovery and data mining, pp. 767-772, ACM, 2006.

K. Das and J. Schneider, "Detecting anomalous records in categorical datasets," in Proceedings of the 13th ACM SIGKDD international conference on Knowledge discovery and data mining, pp. 220-229, ACM, 2007.

P. Oman and M. Phillips, "Intrusion detection and event monitoring in scada networks," Critical Infrastructure Protection, pp. 161-173, 2007.

D. M. Farid and M. Z. Rahman, "Learning intrusion detection based on adaptive bayesian algorithm," in Computer and Information Technology, 2008. ICCIT 2008. 11th International Conference on, pp. 652-656, IEEE, 2008.

V. Chandola, A. Banerjee, and V. Kumar, "Anomaly detection: A survey," ACM computing surveys (CSUR), vol. 41, No. 3, 58 pages, 2009.

C. Zimmer, B. Bhat, F. Mueller, and S. Mohan, "Time-based intrusion detection in cyber-physical systems," in Proceedings of the 1st ACM/IEEE International Conference on Cyber-Physical Systems, pp. 109-118, ACM, 2010.

A. Carcano, A. Coletta, M. Guglielmi, M. Masera, I. N. Fovino, and A. Trombetta, "A multidimensional critical state analysis for detecting intrusions in scada systems," IEEE Transactions on Industrial Informatics, vol. 7, No. 2, pp. 179-186, 2011.

Q. He and R. S. Blum, "Smart grid monitoring for intrusion and fault detection with new locally optimum testing procedures," in Acoustics, Speech and Signal Processing (ICASSP), 2011 IEEE International Conference on, pp. 3852-3855, IEEE, 2011.

A. A. Elhadi, M. A. Maarof, and A. H. Osman, "Malware detection based on hybrid signature behaviour application programming interface call graph," American Journal of Applied Sciences, vol. 9, No. 3, p. 283, 2012.

R. Mitchell, IR Chen, "Behavior Rule Based Intrusion Detection for Supporting Secure Medical Cyber Physical Systems", in Computer Communications and Networks (ICCCN), 2012 21st International Conference on, pp. 1-7, IEEE, 2012.

R. Mitchell and R. Chen, "Effect of intrusion detection and response on reliability of cyber physical systems," IEEE Transactions on Reliability, vol. 62, No. 1, pp. 199-210, 2013.

A. Jones, Z. Kong, and C. Belta, "Anomaly detection in cyber-physical systems: A formal methods approach," in Decision and Control (CDC), 2014 IEEE 53rd Annual Conference on, pp. 848-853, IEEE, 2014.

R. Mitchell, IR Chen, "A survey of intrusion detection techniques for cyber-physical systems," ACM Computing Surveys (CSUR), vol. 46, No. 4, 29 pages, 2014.

A. Hoehn and P. Zhang, "Detection of covert attacks and zero dynamics attacks in cyber-physical systems," in American Control Conference (ACC), 2016, pp. 302-307, IEEE, 2016.

J. Zhao, J. Wang, and L. Yin, "Detection and control against replay attacks in smart grid," in Computational Intelligence and Security (CIS), 2016 12th International Conference on, pp. 624-627, IEEE, 2016.

P. Krishnamurthy, R. Karri, F. Khorrami, "Anomaly detection in real-time multi-threaded processes on embedded cps devices using hardware performance counter." CRRL-1107-09/17-R, NYU Tandon School of Engineering, 2017.

* cited by examiner

110

354/364

ANOMALOUS BEHAVIOR DETECTION IN PROCESSOR BASED SYSTEMS

CROSS-REFERENCE TO RELATED APPLICATIONS

This application claims priority to and the benefit of U.S. Provisional Patent Application Ser. No. 62/670,245, filed May 11, 2018, which is incorporated herein by this reference in its entirety.

GOVERNMENT RIGHTS

This invention was made with Government support under contract number N00014-17-C-1011 awarded by the Office of Naval Research, and contract number FA8750-16-C-0179 awarded by Air Force Research Laboratory, and under grant number 1526399 awarded by the National Science Foundation. The Government has certain rights in this invention.

FIELD

Embodiments of the present principles generally relate to cyber security, and more particularly, to methods, apparatuses, and systems for the detection of anomalous behavior in processor based systems.

BACKGROUND

A cyber-physical system (CPS) is a computer-based system integrated with physical inputs (e.g., sensors) and outputs (e.g., actuators), connected by networks. A cyber-physical system is able to collect data from the real physical world, communicate and transfer data among nodes in the system, and process the data to intelligently control physical systems. Cyber-physical systems are deployed in many areas, including the sensing and control of energy, the health-care industry, civil infrastructure, transportation systems, and entertainment systems. Representative examples of cyber-physical systems include smart power grids, water treatment systems, carbon dioxide monitoring systems to support green transportation, heart disease monitoring systems, autonomous driving systems, and distributed autonomous gardening systems, just to name a few.

Cyber-physical systems, however, are wide open to security threats and can become a security nightmare. For example, many cyber-physical systems include IoT devices which are very susceptible to security attacks. Attacks on the cyber-physical systems can result in severe physical damage to the components of the cyber-physical systems and connected systems and can result in a loss of privacy of information intended to be kept private.

Current malware detection methods require having at least the attack code and sometimes also having the legitimate code. Most times however, getting the attack code is very difficult and in some instances, such as for zero-day attacks, there is no known code.

SUMMARY

Embodiments of methods, apparatuses and systems for detection of anomalous behavior in cyber-physical systems are disclosed herein.

In some embodiments in accordance with the present principles, a method for anomaly detection in a processor based system includes training a deep learning sequence prediction model using observed baseline behavioral sequences of at least one processor behavior of the processor based system, predicting baseline behavioral sequences from the observed baseline behavioral sequences using the sequence prediction model, determining a baseline reconstruction error distribution profile using the baseline behavioral sequences and the predicted baseline behavioral sequences, predicting test behavioral sequences from observed, test behavioral sequences using the sequence prediction model, determining a testing reconstruction error distribution profile using the observed test behavioral sequences and the predicted test behavioral sequences, and comparing the baseline reconstruction error distribution profile to the testing reconstruction error distribution profile to determine if an anomaly exists in a processor behavior of the processor based system.

In some embodiments the method can further include determining if a shift exists between the baseline reconstruction error distribution profile and the testing reconstruction error distribution profile to determine that an anomaly exists in a processor behavior of the processor based system and alerting a user of the processor based system to the existence of an anomaly in the processor based system.

In some embodiments, an apparatus in a processor based system for anomaly detection includes a sequence generator module to train a deep learning sequence prediction model using baseline behavioral sequences of at least one processor behavior of the processor based system observed by at least one sensor, predict baseline behavioral sequences from the observed baseline behavioral sequences using the sequence prediction model, determine a baseline reconstruction error distribution profile using the baseline behavioral sequences and the predicted baseline behavioral sequences, predict test behavioral sequences from test behavioral sequences observed by the at least one sensor using the sequence prediction model, and determine a testing reconstruction error distribution profile using the observed test behavioral sequences and the predicted test behavioral sequences. The apparatus can further include a sequence analysis module to compare the baseline reconstruction error distribution profile to the testing reconstruction error distribution profile to determine if an anomaly exists in a processor behavior of the processor based system.

In some embodiments, a processor based system for anomaly detection includes at least one sensor observing processor functionality of a processor of the processor based system and a computing platform. In some embodiments, the computing platform includes at least one processor and a memory coupled to the processor, the memory having stored therein at least one of programs or instructions executable by the at least one processor to configure the computing platform to train a deep learning sequence prediction model using baseline behavioral sequences of the at least one processor observed by the at least one sensor, predict baseline behavioral sequences from the observed baseline behavioral sequences using the sequence prediction model, determine a baseline reconstruction error distribution profile using the baseline behavioral sequences and the predicted baseline behavioral sequences, predict test behavioral sequences from test behavioral sequences observed by the at least one sensor using the sequence prediction model, determine a testing reconstruction error distribution profile using the observed test behavioral sequences and the predicted test behavioral sequences, and compare the baseline reconstruction error distribution profile to the testing reconstruction error distribution profile to determine if an anomaly exists in a processor behavior of the processor based system.

In some embodiments, a non-transitory computer-readable medium has stored thereon at least one program, the at least one program including instructions which, when executed by a processor, cause the processor to perform a method in a processor based system for anomaly detection, which includes training a deep learning sequence prediction model using observed baseline behavioral sequences of at least one processor behavior of the processor based system, predicting baseline behavioral sequences from the observed baseline behavioral sequences using the sequence prediction model, determining a baseline reconstruction error distribution profile using the baseline behavioral sequences and the predicted baseline behavioral sequences, predicting test behavioral sequences from observed, test behavioral sequences using the sequence prediction model, determining a testing reconstruction error distribution profile using the observed test behavioral sequences and the predicted test behavioral sequences, and comparing the baseline reconstruction error distribution profile to the testing reconstruction error distribution profile to determine if an anomaly exists in a processor behavior of the processor based system.

In some embodiments in accordance with the present principles, a method for anomaly detection in a processor based system includes predicting baseline behavioral sequences from observed baseline behavioral sequences using a deep learning sequence prediction model, the deep learning sequence prediction model trained using observed baseline behavioral sequences of at least one processor of the processor based system, determining a baseline reconstruction error distribution profile using the baseline behavioral sequences and the predicted baseline behavioral sequences, predicting test behavioral sequences from observed, test behavioral sequences using the sequence prediction model, determining a testing reconstruction error distribution profile using the observed test behavioral sequences and the predicted test behavioral sequences, and comparing the baseline reconstruction error distribution profile to the testing reconstruction error distribution profile to determine if an anomaly exists in a processor behavior of the processor based system.

In some embodiments the method can further include training the deep learning sequence prediction model using the observed baseline behavioral sequences of at least one processor behavior of the processor based system.

In some embodiments the method can further include determining if a shift exists between the baseline reconstruction error distribution profile and the testing reconstruction error distribution profile to determine that an anomaly exists in a processor behavior of the processor based system and alerting a user of the processor based system to the existence of an anomaly in the processor based system.

In some embodiments, an apparatus in a processor based system for anomaly detection includes a sequence generator module to predict baseline behavioral sequences from observed baseline behavioral sequences using a deep learning sequence prediction model, the deep learning sequence prediction model trained using observed baseline behavioral sequences of at least one processor of the processor based system, determine a baseline reconstruction error distribution profile using the baseline behavioral sequences and the predicted baseline behavioral sequences, predict test behavioral sequences from test behavioral sequences observed by the at least one sensor using the sequence prediction model, and determine a testing reconstruction error distribution profile using the observed test behavioral sequences and the predicted test behavioral sequences. The apparatus can further include a sequence analysis module to compare the baseline reconstruction error distribution profile to the testing reconstruction error distribution profile to determine if an anomaly exists in a processor behavior of the processor based system.

In some embodiments, the apparatus is further configured to train the deep learning sequence prediction model using the baseline behavioral sequences of at least one processor behavior of the processor based system observed by the at least one sensor.

In some embodiments, a processor based system for anomaly detection includes at least one sensor observing processor functionality of a processor of the processor based system and a computing platform. In some embodiments, the computing platform includes at least one processor and a memory coupled to the processor, the memory having stored therein at least one of programs or instructions executable by the at least one processor to configure the computing platform to train a deep learning sequence prediction model using baseline behavioral sequences of the at least one processor observed by the at least one sensor, predict baseline behavioral sequences from the observed baseline behavioral sequences using the sequence prediction model, determine a baseline reconstruction error distribution profile using the baseline behavioral sequences and the predicted baseline behavioral sequences, predict test behavioral sequences from test behavioral sequences observed by the at least one sensor using the sequence prediction model, determine a testing reconstruction error distribution profile using the observed test behavioral sequences and the predicted test behavioral sequences, and compare the baseline reconstruction error distribution profile to the testing reconstruction error distribution profile to determine if an anomaly exists in a processor behavior of the processor based system.

In some embodiments, a non-transitory computer-readable medium has stored thereon at least one program, the at least one program including instructions which, when executed by a processor, cause the processor to perform a method in a processor based system for anomaly detection, which includes predicting baseline behavioral sequences from observed baseline behavioral sequences using a deep learning sequence prediction model, the deep learning sequence prediction model trained using observed baseline behavioral sequences of at least one processor of the processor based system, determining a baseline reconstruction error distribution profile using the baseline behavioral sequences and the predicted baseline behavioral sequences, predicting test behavioral sequences from observed, test behavioral sequences using the sequence prediction model, determining a testing reconstruction error distribution profile using the observed test behavioral sequences and the predicted test behavioral sequences, and comparing the baseline reconstruction error distribution profile to the testing reconstruction error distribution profile to determine if an anomaly exists in a processor behavior of the processor based system.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1A:
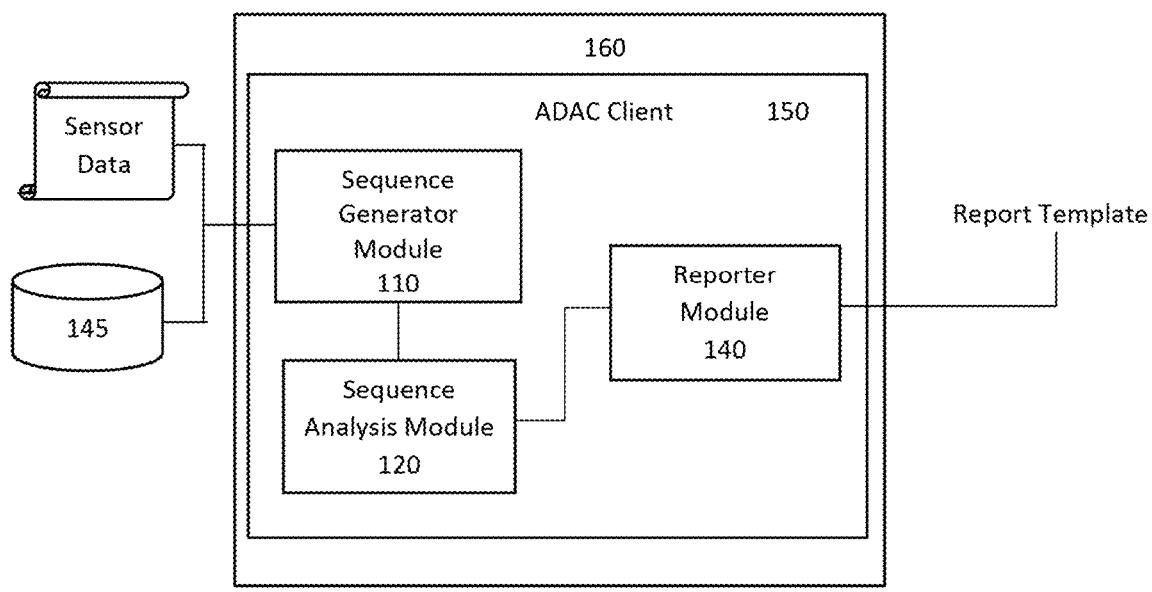
FIG. 1A depicts a high level block diagram of an anomaly detection and characterization system in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for the detection of anomalous behavior in processor based systems. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to monitoring a particular sensor (e.g., a hardware performance counter (HPC)) in a particular system (e.g., an industrial control system (ICS)), such teachings should not be considered limiting. Embodiments in accordance with the present principles can be implemented within substantially any processor based system or other computing system in connection with substantially any sensor of such systems for detecting anomalous behavior in processing functions of processor-based systems within the concepts of the present principles.

In some embodiments, an approach to detecting anomalous behavior in cyber-physical systems in accordance with the present principles is based on a data-driven approach which characterizes normal system/processor operational behavior using data received from system sensors. In some embodiments a deep learning model is used that learns temporal sequences to characterize operational behavior over time, creates reference behavior sequences, and tests (verifies) anomalous behavior against the reference normal operational behavior sequences. That is, patterns in a processor's/system's normal operational behavior can be learned and predicted such that abnormalities/anomalies in processor/system operational behavior can be detected if observed behavior does not match the learned and/or predicted patterns.

FIG. 1A depicts a high level block diagram of an anomaly detection and characterization (ADAC) system 100 in accordance with an embodiment of the present principles. The ADAC system 100 of FIG. 1A illustratively comprises an ADAC client 150 comprising a sequence generator module 110, a sequence analysis module 120. The ADAC system 100 of FIG. 1A further illustratively comprises a local storage device 145.

As depicted in FIG. 1A, embodiments of an ADAC client, such as the ADAC client 150 of FIG. 1A, can be implemented in a computing platform 160 (described in greater detail in FIG. 5) in accordance with the present principles. That is, in some embodiments, the ADAC client 150 comprises a software client, with inputs and outputs from the computing platform 160. In such embodiments, the ADAC client 150 can be implemented as a stand-alone service that is initiated by the user or software application using the computing platform 160 as a dedicated server. Alternatively or in addition, in some embodiments, the ADAC client 150 can be implemented as persistence service of a system server/processor based system in which the ADAC client 150 can actively query deployed sensors. In such embodiments, the persistence service can be accomplished using a defined API (application program interface) that supports direct query to the sensors.

As depicted in FIG. 1A, sequence generator module 110 of the ADAC client 150 receives data results from a plurality of system sensors. In some embodiments, the sensor outputs can be embodied as a report in JavaScript Object Notation (json) format. In several embodiments, the sensor outputs can be described as payloads, since, in such embodiments, a sensor can comprise a software instrument designed to capture different aspects of processor behavior. For example, a sensor can be used to capture memory utilization. Another sensor can be used to capture processor utilization. In some embodiments, the sensor can be installed or already resident on a device/system under test, in a cooperative or uncooperative manner (e.g. a user may willingly want the sensor as part of its defensive process or a user may be unaware of the presence of the sensor).

The sequence generator module 110 of the ADAC 150 analyzes sensor to characterize an operational behavior of a system/device from which the sensor data was received. In some embodiments, the ADAC 150 uses a deep learning model that learns temporal sequences to characterize system/device behavior of a system/device under test.

In some embodiments, the ADAC 150 can generate a respective temporal sequence profile of the operational behaviors of a portion of a device/system under test for which respective sensor data was collected and analyzed. In some embodiments, the sequence generator module 110 can store generated temporal sequence profiles in an associated storage device such as the storage device 145 of FIG. 1A.

Figure 1B:
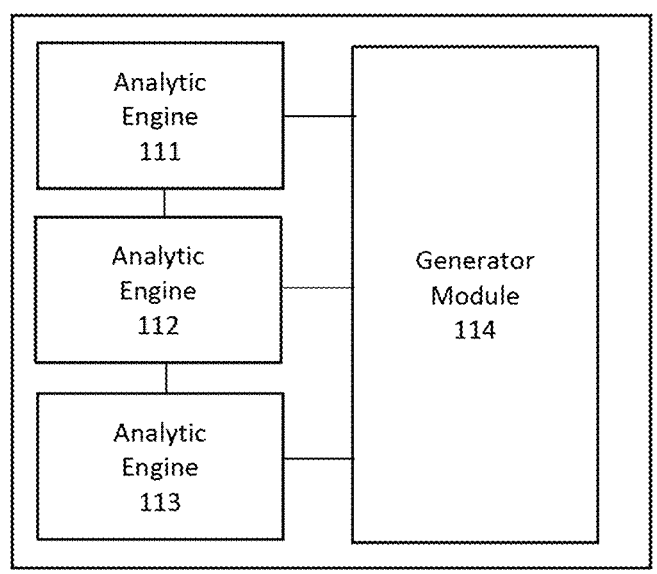
FIG. 1B depicts a high level block diagram of the sequence generator module of FIG. 1A, in accordance with an embodiment of the present principles

FIG. 1B depicts a high level block diagram of the sequence generator module 110 of FIG. 1A, in accordance with an embodiment of the present principles. As depicted in FIG. 1B, the sequence generator module 110 can comprise at least one analytic engine (illustratively three analytic engines 111, 112 and 113) and a generator module 114. The analytic engines 111, 112, and 113 of the sequence generator module 110 can be implemented to interpret data/results communicated from sensors and the generator module 114 can generate respective temporal sequence profiles of a portion of a system/device for which the respective data was collected. That is, in some embodiments, the sequence generator module 110 can include an analytical engine for each sensor of a system/device under test.

In some embodiments in accordance with the present principles, an approach to detecting anomalies in the functionality/behavior of a processor-based device/system is based on predicting temporal sequences (e.g., data points) of observations given past temporal sequences of events. The temporal sequences can be analyzed using deep learning models to determine a sequence prediction model.

For example, in accordance with the present principles, deep neural networks, such as Convolutional Neural Networks (CNNs) for spatial data modeling and Recurrent Neural Networks (RNNs) for sequential data modeling, can be used by the ADAC 150 to determine anomalies in sensor data related to abnormal operational behavior of a system/device under test using error distribution because the deep neural networks automatically determine inherent features of data. That is for using neural networks for evaluation of the behaviors of processor-based systems/devices, the following was determined by the inventors: normal programs and processor behavior are predictable by using history behaviors; there are strong relations between previous and future program instructions executed, present and past program instructions executed (and any other relatable data points), although the relations are implicit and need to be explored; a sequence predictor, trained on baseline (normal) behaviors, will have different prediction error distributions when comparing sensor data of abnormal sequences with predicted normal sequences. In general, the errors are larger for abnormal sequences. Samples from different distributions can be distinguished by statistical tests, such as the t-test and the Kolmogorov-Smirnov (KS) test. In general, if a system/device behaves normally, the operational behaviors are highly predictable by a trained deep temporal model. The model predictions and real observations are close. On the other hand, if the system/device behave abnormally, there would be large differences between the normal predictions and abnormal real observations. Thus, determining whether the differences are from the same distribution by using statistical testing is equivalent to anomaly detection.

In some embodiments, deep learning models for sequence predictors, such as LSTM and CRBM, are trained with normal baseline historical behavioral sequences to predict baseline behaviors, such as behaviors (e.g., data points) in the past, present and in the future. A baseline (normal) reconstruction error distribution is determined as the reference distribution. In some embodiments, a squared error of the prediction vector and the ground-truth vector are used as the reconstruction error. The sequence predictor is used to predict baseline operational behaviors (e.g., data points) using the historical behavior. A reconstruction error distribution of the real observed (testing) sensor data is determined for normal and abnormal functional behavior. The ADAC 150 is then able to determine if the baseline (normal) reconstruction error distribution and the reconstruction error distribution of the observed (testing) sensor data are from the same distribution. As previously described, in some embodiments a Kolmogorov-Smirnov test is performed to determine if the baseline (normal) reconstruction error distribution and the reconstruction error distribution of the observed (testing) sensor data are from the same distribution. If not, a shift in the to reconstruction error distributions is identified and an anomaly is detected.

Figure 2:
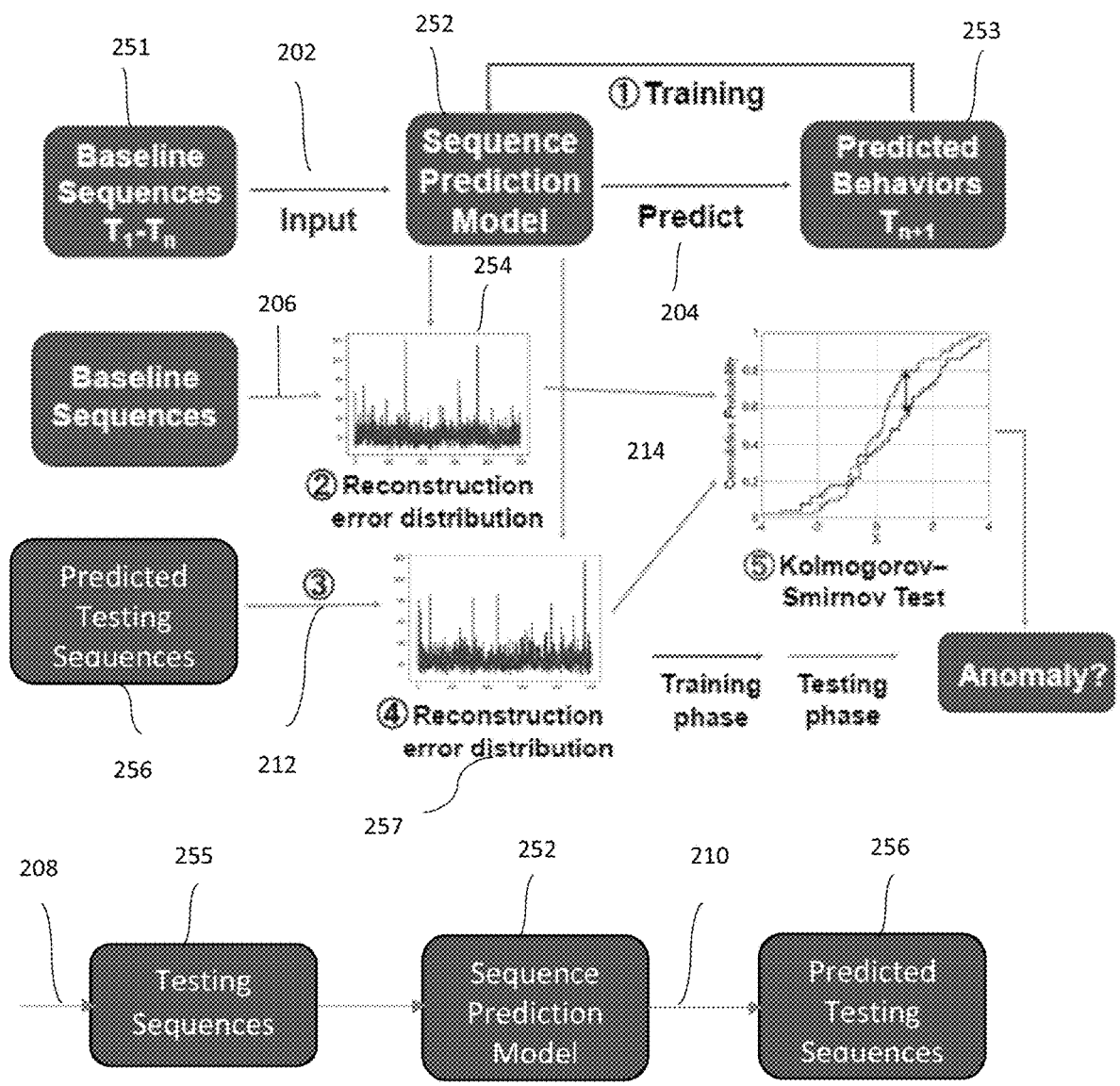
FIG. 2 depicts a functional block diagram of a process for detecting anomalies in the functionality/behavior of a processor-based device/system based on a determination of a sequence prediction model and reconstruction error distribution in accordance with an embodiment of the present principles.

FIG. 2 depicts a functional block diagram of a process for detecting anomalies in the functionality/behavior of a processor-based device/system based on a determination of a sequence prediction model and reconstruction error distribution in accordance with an embodiment of the present principles. As depicted in FIG. 2, in some embodiments, a sequence prediction model can be trained on normal behavior data. That is, during a time in which a system/device is known to be operating properly, sensor data can be collected and communicated to the sequence generator module 110. The data can be used by the sequence generator module 110 to create respective normal baseline temporal sequence profiles from the data collected from each of the sensors. The temporal sequence profiles created during the time in which the system/device is known to be operating properly, can be used by the sequence generator module 110 to create a normal baseline operational profile for the system/device. The normal baseline temporal sequence profiles and the normal baseline operational profile generated by the sequence generator module 110 can be stored in the storage device 145.

As depicted in FIG. 2, at 202 observations of temporal sequences from time $t_1$ to $t_N$ of normal processor behaviors 251 (i.e., baseline sequences) captured by at least one sensor are used to train and create a sequence prediction model 252 using deep learning as described above, by for example in some embodiments, the sequence generator module 110. In the embodiment of FIG. 2, at 204, the sequence prediction model 252 is used to predict baseline behavioral sequences 253. For example, in some embodiments, the sequence prediction model 252 is used to predict baseline behavioral sequences in the future, after time $t_N$, by for example in some embodiments, the sequence generator module 110. At 206, the baseline behavioral sequences 251 and the predicted baseline behavioral sequences 253 are used to determine a baseline (i.e., reference) reconstruction error distribution (RED) profile 254 as previously described above, by for example in some embodiments, the sequence generator module 110.

At 208, observations of temporal sequences of processor behavior under regular operating conditions (i.e., testing sequences) 255 are captured by at least one sensor and communicated to, for example in some embodiments, the sequence generator module 110. At 210, the sequence prediction model 252 is used to predict test behavioral sequences 256 (e.g., past, present and/or future data points), using for example in some embodiments, the sequence generator module 110. At 212, the testing behavioral sequences 255 and the predicted future testing behavioral sequences 256 are used to determine a testing (i.e., observed) reconstruction error distribution (RED) profile 257, using for example in some embodiments, the sequence generator module 110.

In accordance with embodiments of the present principles, at 214, an anomaly in the behavior/functionality of a system/device can be detected by comparing the reference RED profile 254 and the observed RED profile 257, using for example in some embodiments, the sequence analysis module 120. In the embodiment of FIG. 2, in the sequence analysis module 120, a Kolmogorov-Smirnov (K-S) test can be used to compare the reference RED profile 254 and the observed RED profile 257 to determine if the RED profiles 254, 257 are from the same distribution to determine if an anomaly exists, as previously described above. In some embodiments, if the K-S test determines a shift between the baseline reconstruction error distribution profile and the testing reconstruction error distribution profile, the presence of an anomaly is detected.

Although in the embodiment of FIG. 2, the K-S test is used as the statistical test to compare the RED profiles 254, 257, alternatively or in addition, any two-sample test or even a random test can be used in accordance with the present principles. In some embodiments in accordance with the present principles, at least one of the observed baseline behavioral sequences and the observed, test behavioral sequences can include a distribution of at least one of instructions and events. In addition, in accordance with some embodiments of the present principles, a number of behavioral sequences used to train the deep learning sequence prediction model and predict baseline behavioral sequences and test behavioral sequences is dependent upon a granularity desired for characterizing behaviors of a processor of a subject system/device. In addition, although in the embodiment of FIG. 2, the deep learning sequence prediction model is described as being trained by for example the sequence generator module 110, alternatively or in addition, in some embodiments the deep learning sequence prediction model can be trained at a remote location and communicated to an ADAC client in accordance with the present principles, such as the ADAC client 150, for implementation in accordance with the present principles described herein. For example, in some embodiments, a deep learning sequence prediction model in accordance with the present principles can be created and trained at a factory for a subject system/device to be evaluated for anomalies as described herein.

In some embodiments in accordance with the present principles, the results of the statistical analysis can be reported to a user. For example and referring back to FIG. 1, the ADAC client 150 can further include an optional reporter module 140 which can generate a Report to be presented to a user. For example, in some embodiments, the optional reporter module 140 can generate a Report based on a format provided by a Report Template (see FIG. 1). In some embodiments, the report can be a human readable file including summary of the results of the ADAC client 150. The reports can be time-stamped for future analysis and archival purposes. In some embodiments, the optional reporter module 140 can also generate metadata for visualization via a GUI service that can be provided by, for example, the computing platform 160.

The optional reporter module 140 of the ADAC client 150 of FIG. 1A can also be configured to provide outputs in other formats for ingestion into other systems. For example, in some embodiments, the optional reporter module 140 can generate outputs in at least one of a Structured Threat Information Expression (STIX) format and a Trusted Automated Exchange of Indicator Information (TAXII) format. In some embodiments, the optional reporter module 140 can generate MCF outputs for ingestion into an Elasticsearch, Logstash, Kibana (ELK) analytics tool.

Figure 3:
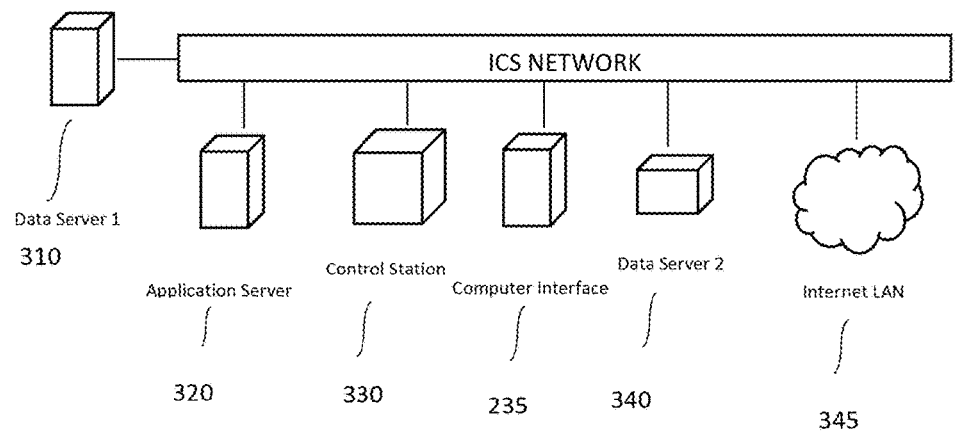
FIG. 3 a high level block diagram of an industrial control system for controlling a processor based system in which an embodiment of the present principles can be applied.
Figure 3:
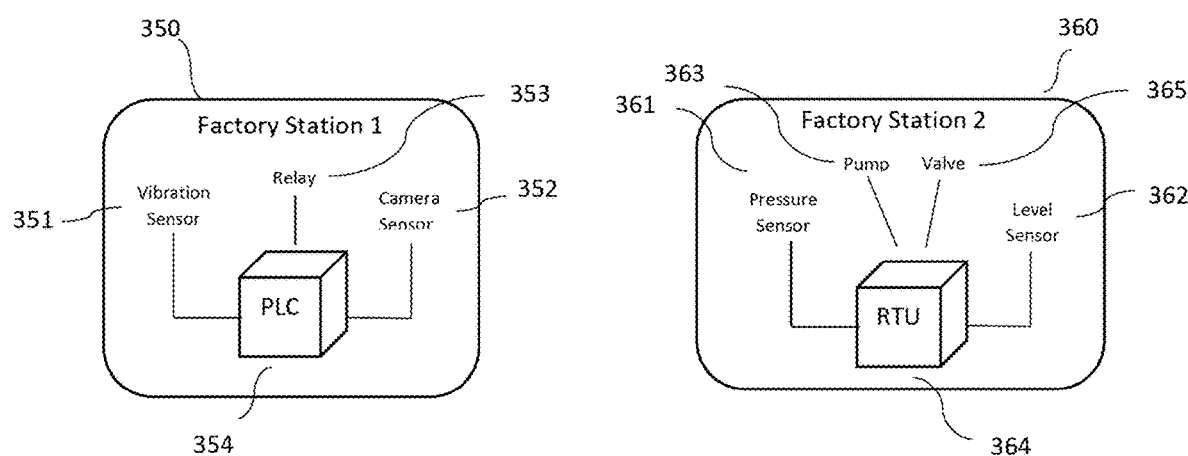

FIG. 3 a high level block diagram of an industrial control system 300 (ICS) for controlling a processor based system, depicted by a first factory station 350 and a second factory station 360, in which an embodiment of an ADAC of the present principles can be applied. The ICS system 300 of FIG. 3 illustratively comprises a first data server 310, an application server 320, a control station 330, a computer interface station 335, and a second data server 340 and an Internet LAN 345. FIG. 3 further depicts a first factory station 350 and a second factory station 360 of the processor based system (not shown) to be controlled by the ICS 300. Illustratively, in FIG. 3, the first remote factory station 350 comprises a vibration sensor 351, a camera sensor 352, a relay 353 and a Programmable Logic Controller (PLC) 354. The second factory station 360 illustratively comprises a pressure sensor 361, a level sensor 362, a pump 363, a valve 365 and a Remote Terminal Unit (RTU) 364.

In the embodiment of FIG. 3, while the ICS and components are similar to general information processing systems, the first and second remote factory stations 350, 360 are cyber-physical systems of the processor based system that can be attacked through cyber-attacks or through physical attacks. The embodiment of FIG. 3 will focus on cyber-attacks which affect the PLC 354 and the RTU 364 (collectively referred to as PLCs 354, 364, hereinafter) of the first factory station 350 and the second factory station 360. In the embodiment of FIG. 3, the PLCs 354, 364 obtain inputs from sensors, and output control signals to actuators according to a control code.

Figure 4:
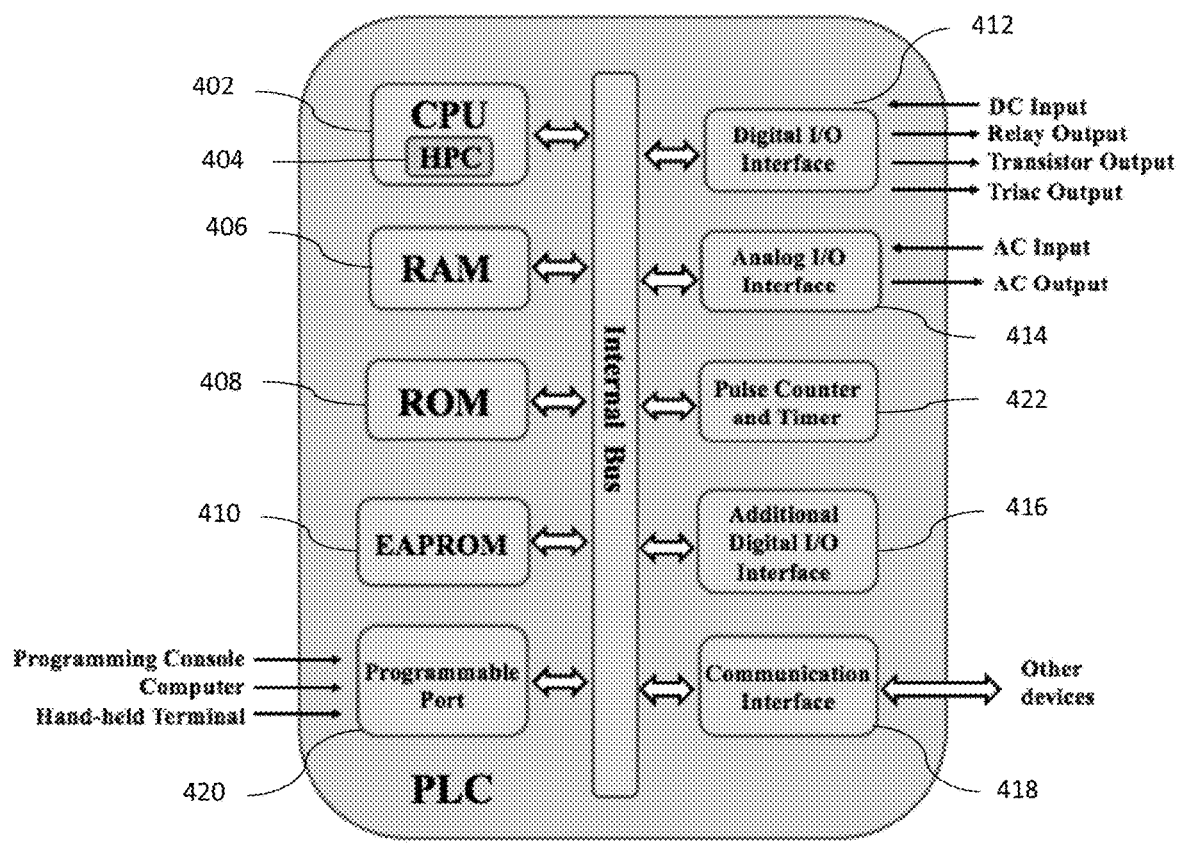
FIG. 4 depicts a high level block diagram of a PLC of the first factory station and the RTU of the second factory station of the ICS of FIG. 3 in accordance with an embodiment of the present principles.

FIG. 4 depicts a high level block diagram of a PLC or RTU, such as the PLC 354 of the first factory station 350 and the RTU 364 of the second factory station 360. The PLC 354, 364 of FIG. 4 illustratively comprise a central processing unit 402 running a hardware performance counter (HPC) 404. The PLC 354, 364 of FIG. 4 further illustratively comprises several memory systems such as a RAM 406, a ROM 408, and an EAPROM 410. The PLC 354, 364 of FIG. 4 further illustratively comprises several I/O systems such as a digital I/O interface 412, an analog I/O interface 414, an additional digital I/O interface 416, and a communication interface 418 to communicate with other devices. The PLC 354, 364 of FIG. 4 further illustratively comprises a programmable port 420 and pulse counter and timer 422. In general, the PLC 354, 364 of FIG. 4 receive inputs from sensors from, for example, target devices to be monitored, and make decisions and communicate commands to control a large range of devices and actuators.

In the embodiment of FIG. 4, the HPC 404 is used as a sensor for providing data to embodiments of an ADAC such as the ADAC 150 of FIG. 1A in accordance with the present principles, for determining abnormalities in an operational behavior of at least one of the first factory station 350 and the second factory station 360 of the ICS 300. That is, the embedded control codes on the PLCs 354, 364 of the first factory station 350 and the second factory station 360 are monitored through respective HPCs 404, in order to detect possible attacks against the ICS.

As described above, in accordance with the present principles, instructions and events on the PLCs 354, 364 can be monitored by the HPC 404 for each of the first factory station 350 and the second factory station 360. In some embodiments, control codes on the PLCs 354, 364 are monitored by the HPC 404 for each of the first factory station 350 and the second factory station 360 and related data is communicated to the ADAC 150 of FIG. 1A. In some embodiments, the ADAC 150 uses a deep learning model during a time in which the first factory station 350 and the second factory station 360 are operating normally to create at least one of respective normal temporal sequence profiles and a respective normal operational profile of the operation of the first factory station 350 and the second factory station 360. Subsequent embedded control codes on the PLCs 354, 364 of the first factory station 350 and the second factory station 360 monitored by the HPCs 404

In accordance with the present principles, the HPCs 404 can be used to monitor embedded control codes on the PLCs 354, 364 of the first factory station 350 and the second factory station 360 during a time in which the first factory station 350 and the second factory station 360 are operating properly. The ADAC 150 generates normal temporal sequence profiles of embedded control codes on the PLCs 354, 364 of the first factory station 350 and the second factory station 360 and can generate a normal operational baseline profile for the first factory station 350 and the second factory station 360. Subsequent embedded control codes on the PLCs 354, 364 of the first factory station 350 and the second factory station 360 monitored by the HPCs 404 and communicated by the HPCs 404 can again be communicated to the ADAC 150. The ADAC 150 again generates temporal sequence profiles of embedded control codes on the PLCs 354, 364 of the first factory station 350 and the second factory station 360. The temporal sequence profiles generated from the subsequent embedded control codes on the PLCs 354, 364 of the first factory station 350 and the second factory station 360 monitored by the HPCs 404 can be used by the ADAC 150 as described above to determine if anomalies exist in the operation of the PLCs 354, 364 of the first factory station 350 and the second factory station 360.

As described above, in some embodiments to determine anomalies, deep temporal models are trained to predict a next time frame based on history frames. That is, in some embodiments, normal processor behaviors are learned using the deep learning model by observing temporal sequences of the processor behavior to characterize processor behavior over time. A time sequence can be defined as s1; s2 . . . $s_{T-1}$; $s_T$. Each $s_i$ is a vector of the HPC values. In one experimental embodiment, four common HPC values were collected for each of the 23 threads running on a PLC as inputs to an LSTM or CRBM deep learning model. The LSTM was trained as a sequence-to-sequence model to predict data points and in one embodiment to predict the future. $i_t$ can be defined as the input vector (real observation) of time frame t, and $o_t$ as the LSTM output vector of time frame t. The loss function for training the LSTM can be defined as the accumulated squared error of $i_t$ and $o_t$ according to equation one (1) as follows:

$$\mathrm{Loss}(t) = E((i_{t-(N-1):t} - o_{t-N:t-1})^2) \quad (1)$$

$$= \frac{1}{N}\sum_{k=0}^{N-1}(i_{t\cdots k} - o_{t\cdots k\cdots 1})^2$$

where N is the accumulation length.

For a loss function for training the LSTM, the squared errors of $i_{t-k}$ and $o_{t-k-1}$ are accumulated for N time frames, and then a gradient descent is applied on the loss function. After training the LSTM model, the model can be used for predicting the normal behaviors of the PLCs 254, 264 of the first factory station 250 and the second factory station 260 monitored by the HPCs 304. Similar to training the LSTM, the squared errors between the model predictions $o_t$ and the observed values $i_t$ are accumulated. However, there are two main differences.

Firstly, model predictions can be used as inputs to trigger further predictions (i.e., $i_t=o_{t-1}$). Inputting the predictions of previous steps can amplify the inherent prediction capacity of the model. Intuitively, inputting previous predictions is like "free prediction" without error correction, while inputting observed values is like correcting the errors in every time frame.

Secondly, the accumulation length, L, for prediction is generally shorter than N in the training phase. This is because a longer accumulation length induces a longer delay. In addition, inputting previous outputs introduces a potential risk of divergence, for example, very large prediction errors even for normal behaviors, in long future predictions because of the weak relationship between history and the very long future.

In other embodiments, training and prediction with CRBM is similar to LSTM. However, the history window is fixed for CRBM. The CRBM can be trained to predict the behaviors in the future with the history values in the fixed-size window. In the prediction phase, the window of observations is a sliding window, so the CRBM model can predict the future with the fixed window size. In contrast to CRBM, LSTM is able to auto-adjust the window size. In addition to the fixed window size, training CRBM is generally not as easy as LSTM, because CRBM is a stochastic model and uses sampling techniques in the training phase.

Figure 5:
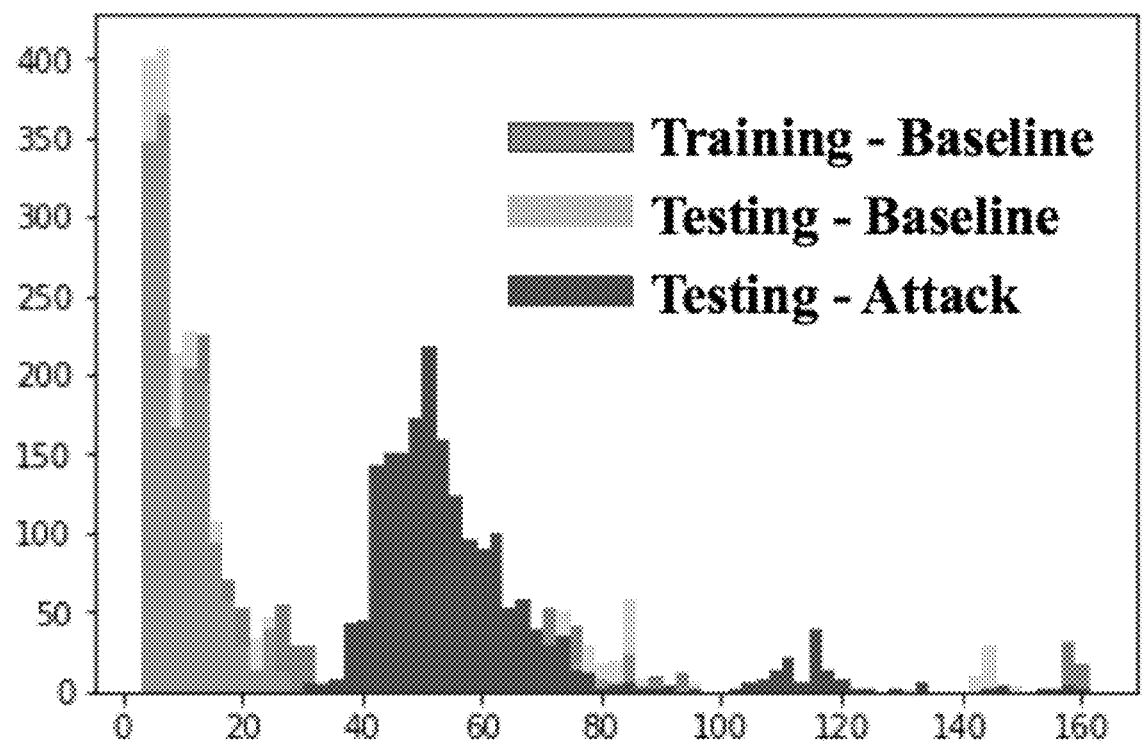
FIG. 5 depicts a histogram of a reconstruction error distribution of training normal behavioral sequences (blue) and testing normal sequences (orange) and abnormal sequences (red) of, for example, the PLCs of FIG. 3 in accordance with an embodiment of the present principles.

FIG. 5 depicts a histogram of a reconstruction error distribution of training normal behavioral sequences (blue) and testing normal sequences (orange) and abnormal sequences (red) of, for example the PLCs 354, 164 of FIG. 3. In FIG. 5, the X-axis is the squared difference (error) of the predictions and real observations and the Y-axis is the number of errors that falls into the corresponding bin. As depicted in FIG. 5, the training baseline distribution (blue) is very similar to the testing baseline distribution (orange). This means the reconstruction error distribution of training and testing normal behaviors are from the same distribution. Alternatively, if the other, observed processor behaviors do not match the learned normal processor behaviors within a predetermined error distribution threshold, an anomaly is detected which can infer the presence of malware in, for example, the PLCs 354, 364 of the first factory station 350 and the second factory station 360 monitored by the HPCs 404. In some embodiments, a distribution threshold can be configured to represent an amount of standard deviation of an anomalous behavior from the nominal values of normal processor behavior, such that thresholds that require tighter bounds (e.g., small deviations from the nominal value) result in identified anomalies having higher confidence scores.

In FIG. 5, the testing, abnormal sequences distribution (red) is very different from the training and testing of the baseline (normal) distributions. In general, the testing abnormal distribution shifts to the right, which means the reconstruction errors of abnormal behaviors are larger than for normal behavior. The current approach enables the detection of anomalies as long as the reconstruction errors are from two different distributions.

In some embodiments, an approach for detecting anomalies in the reconstruction errors, without the Gaussian assumptions can be used. For example, the Kolmogorov-Smirnov (K-S) test can be implemented to determine if the reconstructed error distribution is the same distribution as the predicted error distribution. The K-S test is a nonparametric test of one-dimensional probability distributions that can be used to distinguish whether two sets of samples are from the same distribution.

Although in accordance with the present principles, data from substantially any sensor can be used to determine anomalous behavior in cyber-physical systems, there are many advantages of using HPCs as sensors in accordance with an embodiment of the present principles. For example, HPCs are faster and more power efficient than application level or network level feature monitoring. In addition, HPC's have higher fidelity because signals are being measured right at the processor level.

Even further, some cyber-physical systems do not run with a sophisticated operating system. In such cases, high-level system features cannot be extracted. However, HPCs as processor level features can fairly always be monitored in all cyber-physical systems to determine a normal operational baseline of, for example cyber-physical systems, and then to detect anomalous behavior in the normal operational baseline of the same cyber-physical systems that may indicate cyber-attacks (e.g., malware) as described herein.

A processor provides various CPU performance measurements in real-time in HPCs. HPCs support not only "core", but also "uncore", performance counters. Core refers to the processor, the processor's general-purpose registers and the processor's private caches. Uncore refers to the Level-2 (L2) or Level-3 (L3) cache shared between cores, the integrated memory controllers, and the interconnect to the other cores and shared system components and the I/O hub. Examples of the core HPCs can include, but are not limited to, the number of: instructions retired, elapsed core clock ticks, L2 cache hits and misses, L3 cache misses and hits, and the core frequency. Examples of the uncore HPCs can include, but are not limited to, the number of: bytes read from memory controller(s), bytes written to the memory controller(s), and data traffic transferred by the interconnect links.

Alternatively or in addition, in accordance with the present principles, activity in side channels can be used to determine anomalous behavior in cyber-physical systems as described herein. Side-channels are observable outputs of the system or device under test that is produced, directly or indirectly, from processor execution. That is, in some embodiments, side channels comprise "indirect measurements" of the primary properties/behaviors of processing functions via, for example measurements of computation, communication, and storage. The indirect measurements are side channels in the sense that the measurements do not directly arise from the operation of those elements themselves (i.e., functions are not directly reported by those elements or come from a specific interrupt of the code & CPU). Some examples of side-channels include temperature variations, cooling fan vibrations, timing of burst network transmissions and the like. The side-channels can also be used as inputs to a deep learning system to train upon and to identify anomalous behaviors in accordance with the present principles. Such side-channel observations can be important, for example, for IOT devices, where it is more difficult to task a sensor on a resource-limited processor/memory-subsystem.

Figure 6:
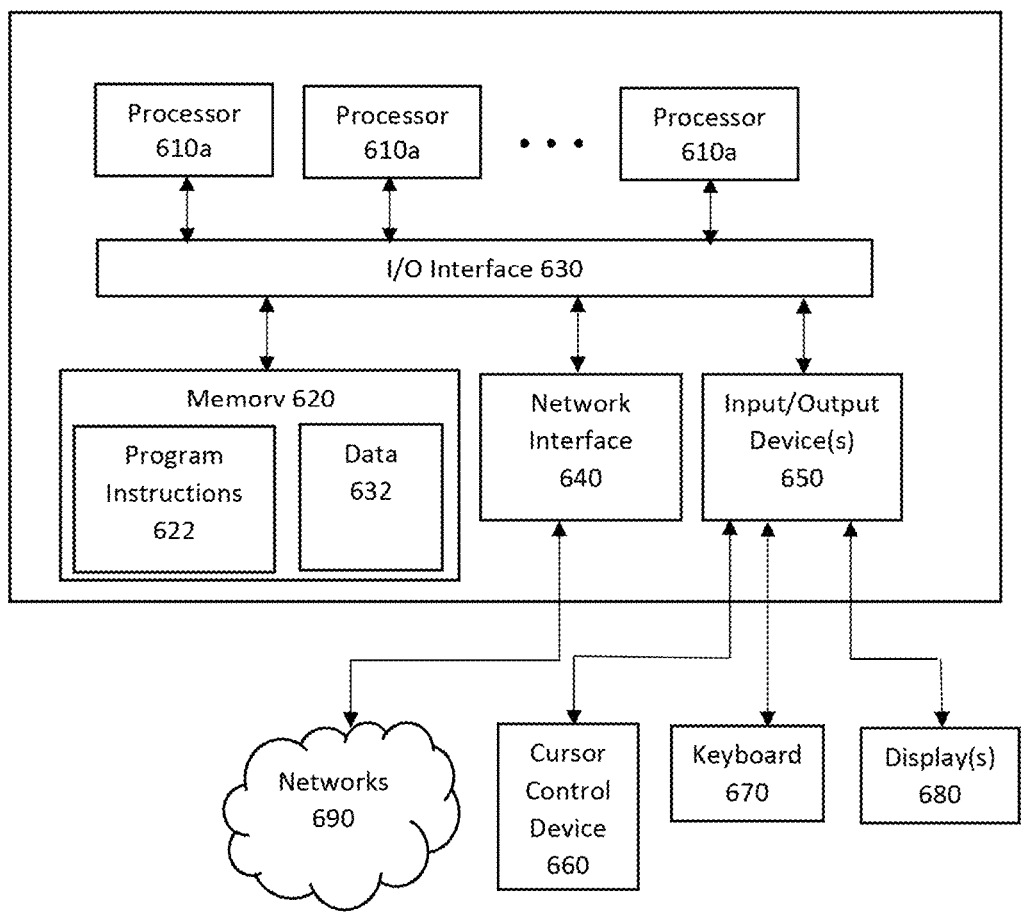
FIG. 6 depicts a high level block diagram of a control unit suitable for use in the anomaly detection and characterization system of FIG. 1A in accordance with an embodiment of the present principles.

FIG. 6 depicts a high level block diagram of a computing platform 160 suitable for use in the anomaly detection and characterization (ADAC) system 100 of FIG. 1A in accordance with an embodiment of the present principles. In some embodiments computing platform 160 can be configured to implement the methods of the present principles as processor-executable executable program instructions 622 (e.g., program instructions executable by processor(s) 610) in various embodiments.

In the embodiment of FIG. 6, the computing platform 160 includes one or more processors 610 a-610 n coupled to a system memory 620 via an input/output (I/O) interface 630. The computing platform 160 further includes a network interface 640 coupled to I/O interface 630, and one or more input/output devices 650, such as cursor control device 660, keyboard 670, and display(s) 680. In various embodiments, any of the components can be utilized by the system to receive user input described herein. In various embodiments, a user interface can be generated and displayed on display 680. In some cases, it is contemplated that embodiments can be implemented using a single instance of computing platform 160, while in other embodiments multiple such systems, or multiple nodes making up computing platform 160, can be configured to host different portions or instances of various embodiments. For example, in one embodiment some elements can be implemented via one or more nodes of computing platform 160 that are distinct from those nodes implementing other elements. In another example, multiple nodes may implement computing platform 160 in a distributed manner.

In different embodiments, computing platform 160 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computing platform 160 can be a uniprocessor system including one processor 610, or a multiprocessor system including several processors 610 (e.g., two, four, eight, or another suitable number). Processors 610 can be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described herein can be stored within system memory 620. In other embodiments, program instructions and/or data can be received, sent or stored upon different types of computer-accessible media or on similar media separate from system memory 620 or computing platform 160.

In one embodiment, I/O interface 630 can be configured to coordinate I/O traffic between processor 610, system memory 620, and any peripheral devices in the device, including network interface 640 or other peripheral interfaces, such as input/output devices 650. In some embodiments, I/O interface 630 can perform any necessary protocol, timing or other data transformations to convert data signals from one component (e.g., system memory 620) into a format suitable for use by another component (e.g., processor 610). In some embodiments, I/O interface 630 can include support for devices attached through various types of peripheral buses, such as a variant of the Peripheral Component Interconnect (PCI) bus standard or the Universal Serial Bus (USB) standard, for example. In some embodiments, the function of I/O interface 630 can be split into two or more separate components, such as a north bridge and a south bridge, for example. Also, in some embodiments some or all of the functionality of I/O interface 630, such as an interface to system memory 620, can be incorporated directly into processor 610.

Network interface 640 can be configured to allow data to be exchanged between computing platform 160 and other devices attached to a network (e.g., network 690), such as one or more external systems or between nodes of computing platform 160. In various embodiments, network 690 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 650 can, in some embodiments, include one or more display terminals, keyboards, keypads, touchpads, scanning devices, voice or optical recognition devices, or any other devices suitable for entering or accessing data by one or more computer systems. Multiple input/output devices 660 can be present in the computing platform 160 or can be distributed on various nodes of the computing platform 160. In some embodiments, similar input/output devices can be separate from the computing platform 160 and can interact with one or more nodes of the computing platform 160 through a wired or wireless connection, such as over network interface 640.

In some embodiments, the illustrated computing platform 160 can implement any of the operations and methods described herein, such as the methods illustrated by the flowchart of FIG. 7 (described below). In other embodiments, different elements and data can be included.

Those skilled in the art will appreciate that computing platform 160 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. Computing platform 160 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

In some embodiments in accordance with the present principles, a user interface to enable a user to interact with at least the computing platform 160 and to control parameters of, for example an MCF system and a subject system, can be provided by the computing platform 160. In some embodiments, the user interface can be implemented as a menu driven application presented on a display of, for example, the computing platform 160 of the present principles, and the and one or more input/output devices of at least the computing platform 160 can be used to provide interaction between a user of the ADAC system and a subject system of the present principles and the user interface.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described herein. In some embodiments, instructions stored on a computer-accessible medium separate from computing platform 160 can be transmitted to computing platform 160 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 7:
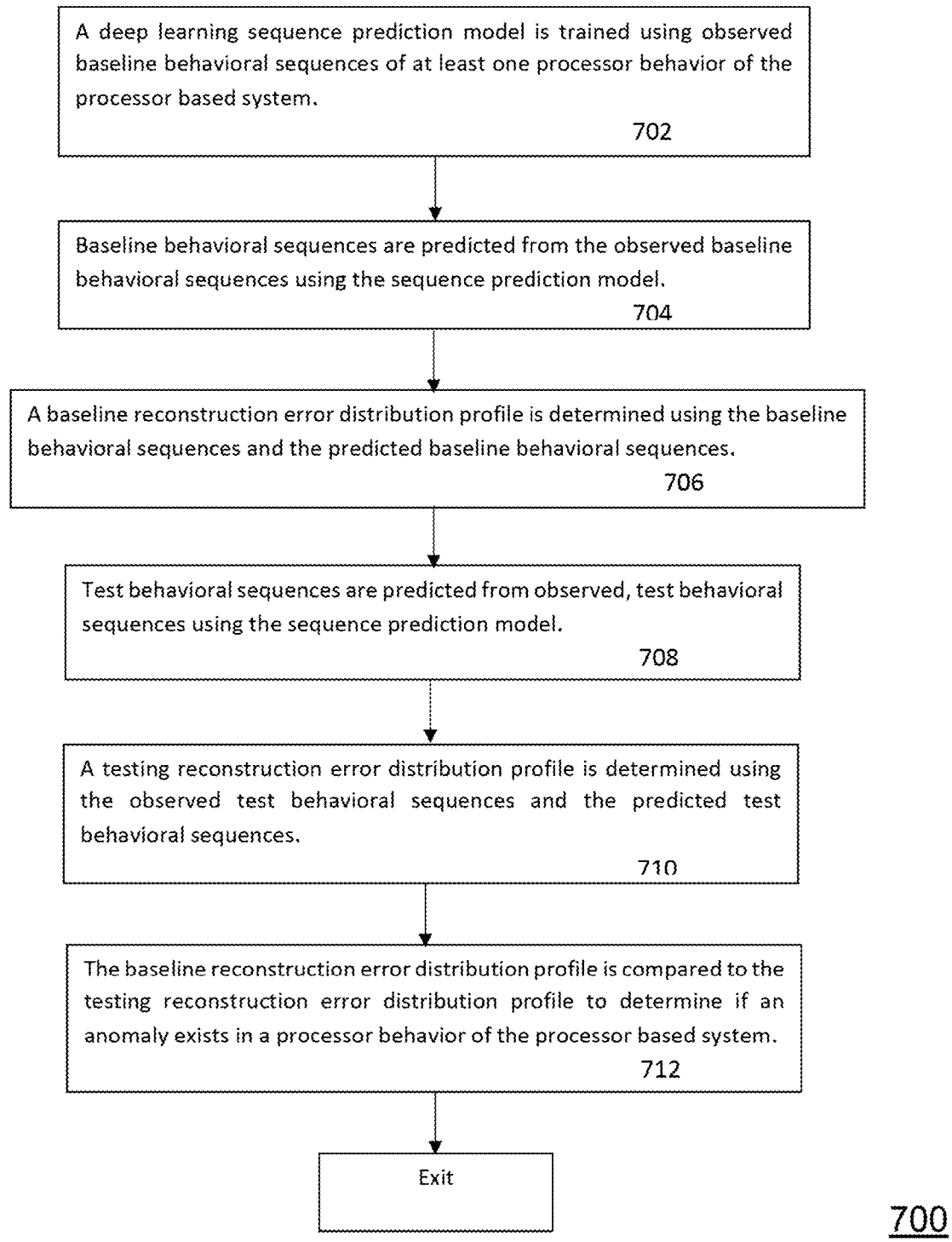
FIG. 7 depicts a flow diagram of a method anomaly detection and characterization in accordance with an embodiment of the present principles.

FIG. 7 depicts a flow diagram of a method 700 for anomaly detection and characterization in a processor-based system in accordance with an embodiment of the present principles. The method 700 begins at 702 during which a deep learning sequence prediction model is trained using observed baseline behavioral sequences of at least one processor behavior of the processor based system. The method 700 can proceed to 704.

At 704, baseline behavioral sequences are predicted from the observed baseline behavioral sequences using the sequence prediction model. The method 700 can proceed to 706.

At 706, a baseline reconstruction error distribution profile is determined using the baseline behavioral sequences and the predicted baseline behavioral sequences. The method 700 can proceed to 708.

At 708, test behavioral sequences are predicted from observed, test behavioral sequences using the sequence prediction model. The method 700 can proceed to 710.

At 710, a testing reconstruction error distribution profile is determined using the observed test behavioral sequences and the predicted test behavioral sequences. The method 700 can proceed to 712.

At step 712, the baseline reconstruction error distribution profile is compared to the testing reconstruction error distribution profile to determine if an anomaly exists in a processor behavior of the processor based system. For example and as described above, in some embodiments, if a shift between the baseline reconstruction error distribution profile and the testing reconstruction error distribution profile is determined, the existence of an anomaly is proven. The method 700 can be exited.

The methods described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing platform or a "virtual machine" running on one or more computing platforms). For example, a machine-readable medium can include any suitable form of volatile or non-volatile memory.

In addition, the various operations, processes, and methods disclosed herein can be embodied in a machine-readable medium and/or a machine accessible medium/storage device compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium/storage device.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for anomaly detection in a processor based system, the method comprising:
   training a deep learning sequence prediction model using observed baseline behavioral sequences of at least one processor behavior of the processor based system;
   predicting baseline behavioral sequences from the observed baseline behavioral sequences using the sequence prediction model;
   determining a baseline reconstruction error distribution profile using the baseline behavioral sequences and the predicted baseline behavioral sequences;
   predicting test behavioral sequences from observed, test behavioral sequences using the sequence prediction model;
   determining a testing reconstruction error distribution profile using the observed test behavioral sequences and the predicted test behavioral sequences; and
   comparing the baseline reconstruction error distribution profile to the testing reconstruction error distribution profile to determine if an anomaly exists in a processor behavior of the processor based system.

2. The method of claim 1, wherein if the comparison determines a shift between the baseline reconstruction error distribution profile and the testing reconstruction error distribution profile, an anomaly is determined to exist in a processor behavior of the processor based system.

3. The method of claim 1, wherein the comparison is performed using a statistical, two-sample test.

4. The method of claim 1, wherein the baseline reconstruction error distribution profile is compared to the testing reconstruction error distribution profile using a Kolmogorov-Smirnov Test.

5. The method of claim 4, wherein if the Kolmogorov-Smirnov Test determines a shift between the baseline reconstruction error distribution profile and the testing reconstruction error distribution profile, an anomaly is assumed to exist in a processor behavior of the processor based system.

6. The method of claim 1, wherein the deep learning sequence prediction model is trained using temporal sequences of the processor behavior to characterize processor behavior over time.

7. The method of claim 1, wherein at least one of the observed baseline behavioral sequences and the observed, test behavioral sequences comprise a distribution of at least one of instructions and events.

8. The method of claim 1, further comprising alerting a user of the processor based system of the existence of an anomaly in the processor based system.

9. The method of claim 1, wherein a number of behavioral sequences used to train the deep learning sequence prediction model is dependent upon a granularity desired for characterizing behaviors of the processor.

10. The method of claim 1, comprising using sensors to observe the processor behavioral sequences, wherein the processor behaviors are monitored using at least one respective sensor for each processor behavior.

11. The method of claim 1, wherein the identification of the anomaly in the processor based system alerts to the possible existence of malware in the processor based system.

12. A processor based system for anomaly detection, comprising:
   at least one sensor observing processor functionality of a processor of the processor based system;
   a computing platform, comprising:
      at least one processor; and
      a memory coupled to the processor, the memory having stored therein at least one of programs or instructions executable by the at least one processor to configure the computing platform to:
         train a deep learning sequence prediction model using baseline behavioral sequences of the at least one processor observed by the at least one sensor;
         predict baseline behavioral sequences from the observed baseline behavioral sequences using the sequence prediction model;
         determine a baseline reconstruction error distribution profile using the baseline behavioral sequences and the predicted baseline behavioral sequences;
         predict test behavioral sequences from test behavioral sequences observed by the at least one sensor using the sequence prediction model;
         determine a testing reconstruction error distribution profile using the observed test behavioral sequences and the predicted test behavioral sequences; and
         compare the baseline reconstruction error distribution profile to the testing reconstruction error distribution profile to determine if an anomaly exists in a processor behavior of the processor based system.

13. A non-transitory computer-readable medium having stored thereon at least one program, the at least one program including instructions which, when executed by a processor, cause the processor to perform a method in a processor based system for anomaly detection, comprising:
   training a deep learning sequence prediction model using observed baseline behavioral sequences of at least one processor behavior of the processor based system;
   predicting baseline behavioral sequences from the observed baseline behavioral sequences using the sequence prediction model;
   determining a baseline reconstruction error distribution profile using the baseline behavioral sequences and the predicted baseline behavioral sequences;
   predicting test behavioral sequences from observed, test behavioral sequences using the sequence prediction model;
   determining a testing reconstruction error distribution profile using the observed test behavioral sequences and the predicted test behavioral sequences; and
   comparing the baseline reconstruction error distribution profile to the testing reconstruction error distribution profile to determine if an anomaly exists in a processor behavior of the processor based system.

14. The non-transitory computer-readable medium of claim 13, wherein the processor is further configured to generate a report including a summary of a result of the comparing.

15. The non-transitory computer-readable medium of claim 14, wherein the report alerts a user of the processor based system of the existence of an anomaly in the processor based system.

16. The non-transitory computer-readable medium of claim 13, wherein if a shift between the baseline reconstruction error distribution profile and the testing reconstruction error distribution profile is determined, an anomaly is determined to exist in a processor behavior of the processor based system.

17. The non-transitory computer-readable medium of claim 13, wherein the baseline reconstruction error distribution profile is compared to the testing reconstruction error distribution profile using a Kolmogorov-Smirnov Test and wherein if the Kolmogorov-Smirnov Test determines a shift between the baseline reconstruction error distribution profile and the testing reconstruction error distribution profile, an anomaly is assumed to exist in a processor behavior of the processor based system.

18. The non-transitory computer-readable medium of claim 13, wherein if it is determined that an anomaly exists in the processor based system, the processor is further configured to alert a user to the possible existence of malware in the processor based system.

19. The processor based system of claim 12, wherein the at least one sensor comprises a hardware performance counter.

* * * * *